Patented Dec. 19, 1939

2,183,627

UNITED STATES PATENT OFFICE 2,183,627

COMPOUNDS OF THE DIBENZANTHRONE SERIES

Otto Stallmann, Bridgeton, N. J., assignor to E. I. du Pont de Nemours & Company, Wilmington, Del., a corporation of Delaware No Drawing. Application May 25, 1938,
Serial No. 209,992

10 Claims. (Cl. 260—355)

This invention relates to the preparation of new compounds of the dibenzanthrone and isodibenzanthrone series and more particularly to the preparation of alkylol ethers of Bz-2,Bz-2'-dihydroxydibenzanthrone and Bz-2,Bz-2'-dihydroxyisodibenzanthrone.

While the alkyl derivatives of hydroxydibenzanthrone compounds have been known for a number of years, their use is relatively limited due to the insolubility of the compounds in many organic solvents and other organic substances.

I have found that by introducing in at least one hydroxy group of Bz-2,Bz-2'-dihydroxydibenzanthrone and Bz-2,Bz-2'-dihydroxyisodibenzanthrone or their derivatives alkyl radicals carrying a free hydroxy group, new compounds are obtained which are suitable not only as vat dyes but which are also suitable as intermediates for the preparation of oil soluble colors and compounds which may be employed in the coloring of artificial plastic masses, and which may also be converted to acid wool dyestuffs.

It is therefore an object of this invention to prepare new alkylol ethers of dihydroxydibenzanthrone and dihydroxyisodibenzanthrone which in themselves exhibit dye properties and which further serve as intermediates for the preparation of new and valuable color bodies.

It is a further object of the invention to prepare new and valuable intermediates of the dibenzanthrone and isodibenzanthrone series which are capable of being sulfonated in the alkyl side chain to give water soluble dyestuffs.

A still further object of the invention is to prepare new and valuable reactive compounds of the dibenzanthrone and isodibenzanthrone series which may be further esterified with organic acid compounds to give new and valuable color bodies.

It is a still further object of the invention to provide a process for the preparation of mixed alkyl and alkylol or cycloalkylol ethers of dihydroxydibenzanthrone which exhibit desirable dyeing and coloring properties.

A still further object is to prepare monoalkylol derivatives of dihydroxydibenzanthrone in substantially quantitative yields, which may be further alkylated to give mixed alkyl ethers of high purity.

Still further objects of the invention and uses of these new compounds will become apparent from the following description.

I have found that new and valuable compounds of the dibenzanthrone and isodibenzanthrone series may be prepared by reacting Bz-2,Bz-2'-dihydroxydibenzanthrone or Bz-2,Bz-2'-dihydroxyisodibenzanthrone with alkylene oxides at elevated temperatures and preferably in the presence of acid catalysts, such as traces of sulfuric acid. The reaction may be carried out in inert organic solvents such as benzene, solvent naphtha, o-dichlorobenzene, etc., or in an excess of the alkylene oxide.

The alkylene oxides which may be employed in this reaction are those of the aliphatic or cyclo-aliphatic series which contain an oxygen bridge connecting adjacent carbon atoms in the aliphatic chain, such as for instance, ethylene oxide, propylene oxide, isobutylene oxide, cyclohexene oxide, etc. The alkylation is preferably carried out at temperatures of from 100 to 200° C. although higher temperatures may be employed where high boiling solvents are used or where the reaction is carried out under pressure.

In the alkylation of the Bz-2,Bz-2'-dihydroxydibenzanthrone under these conditions only one alkylol group is introduced even when an excess of alkylene oxide is employed. Where a large excess of ethylene oxide is employed and high temperatures are used apparently some polymerization of the alkylene oxides in the ether side chain is effected. Because of this selective alkylation, it is possible to prepare mixed ethers of relatively high purity by further alkylating the mono-alkylol ether of the Bz-2,Bz-2'-dihydroxydibenzanthrone with other alkylating agents such as dimethyl sulfate, p-toluenesulfonic acid-methyl ester or with alkylating agents of higher molecular weight, as well as with the dihalogen alkylating agents such as ethylene dibromide, etc.

The mono-alkylol ethers of the Bz-2,Bz-2'-dihydroxydibenzanthrone may be employed as vat dyestuffs, although like all mono-ethers of the dihydroxydibenzanthrone, they dye cotton from a blue vat in blue shades which are not fast to alkalies, changing to yellowish green. On further alkylation, however, new and valuable vat dyestuffs are obtained which dye cotton in bluish green shades of good fastness and levelling properties.

The reaction products of the alkylene oxides of Bz-2,Bz-2'-dihydroxyisodibenzanthrone, however, give directly alkali fast dyestuffs which dye cotton from a blue vat in blue shades. The common alkali metal salts of the leuco derivatives of these alkylol ethers, however, are much more soluble in the vat than the leuco compounds of the known alkyl derivatives of the Bz-2,Bz-2'-dihydroxyisodibenzanthrone, and the leuco sulfuric acid esters of these new alkylol derivatives of Bz-2,Bz-2'-dihydroxyisodibenzanthrone are likewise much more soluble in water than the known sulfuric acid esters of the corresponding straight alkyl derivatives which do not contain the hydroxy radical in the side chain.

The following examples are given to illustrate the invention more fully. The parts used are by weight.

*Example 1*

An amount of a technical filter press cake, containing a slight trace of free sulfuric acid and 40 parts of the purified Bz-2,Bz-2'-dihydroxydibenzanthrone, is stirred into 500 parts of "Solvent Naphtha" and the mass is distilled free from water at a final temperature of 130° C. and then cooled below 30° C. To the remaining dry suspension of dihydroxydibenzanthrone there are added 60 parts of propylene oxide, dissolved in 200 parts of dry "Solvent Naphtha" and the mass is heated in an iron autoclave under agitation for 12 hours at 150 to 155° C. at an average pressure of approximately 50 lbs. per square inch.

The reaction mass is then steam distilled free from solvent and filtered. The filter cake is washed with cold water and dried at 100° C. The product may be purified by dissolving in o-dichlorobenzene at 170 to 175° C., filtering the solution in order to remove small amounts of solvent insoluble impurities and steam distilling the filtrate free from solvent.

The product, thus obtained, is a blue crystalline solid, unstable in concentrated sulfuric acid and soluble in all common inert high boiling organic solvents with a deep blue color, exhibiting a strong reddish brown fluorescence. It dyes cotton from a blue hydrosulfite vat in blue shades, which are fast to diluted acids, but change in diluted alkalis to a very yellowish green, which is characteristic of dyeings of the pure mono-alkyl ethers of dihydroxydibenzanthrone. It is the mono-(beta-hydroxypropyl) ether of dihydroxydibenzanthrone, containing one free hydroxy group in one of the Bz-2 positions and another hydroxy group in the aliphatic ether chain. While the compound possesses some solubility in oil, gasoline, and in other organic materials, imparting a strong bluish coloration with a pronounced reddish fluorescence, its solubility in all kinds of organic materials may be very greatly increased by converting the product into an aliphatic long chain acid ester, as more particularly described in co-pending U. S. application Serial No. 209,995.

The mono-(beta-hydroxypropyl) ether of Bz-2, Bz-2'-dihydroxydibenzanthrone of this example may be converted into valuable vat dyes, belonging to the class of "mixed" or unsymmetrical ethers of dihydroxydibenzanthrone by alkylation with the usual alkylating agents. Only the hydroxy group in one of the Bz-2 positions is alkylated during this reaction resulting in novel bluish green dyeing vat colors of good fastness properties, which by virtue of their free hydroxy group in one of the aliphatic alkyl chains may be further converted by side chain sulfonation into valuable wool and silk dyestuffs of bluish green shades. This further alkylation may be carried out as follows:

*Example 2*

15 parts of the purified mono-(beta-hydroxypropyl) ether of Bz-2, Bz-2'-dihydroxydibenzanthrone (of Example 1) are dissolved in 300 parts of o-dichlorobenzene at 160 to 170° C., 20 parts of soda ash are then added and 15 parts of dimethyl sulfate are introduced slowly within 1 hour, while agitating the mass at 165 to 170° C. Heating is then continued for another 1 to 2 hours at 170 to 175° C., until a test portion of the mass, when vatted and dyed on cotton shows that the dyestuff formed is fast to diluted alkalies. The methylation mass is filtered above 150° C. and the dyestuff is isolated by evaporating the filtrate to one-half of its original volume, adding an equal amount of alcohol to the residual solution at 80° C., allowing the mass to cool to room temperature and filtering off the precipitate.

If the alkylation is carried out in the same manner, except using diethyl sulfate as alkylating agent, the corresponding ethoxy derivative is obtained which dyes slightly bluer in shade, but is otherwise similar in properties to the mono-methoxy ether derivative, described above. Nitrobenzene may be used in place of the o-dichlorobenzene as the solvent for this alkylation.

Using ethylene dibromide as the alkylating agent in the presence of fused sodium acetate and soda ash in o-dichlorobenzene as solvent, an alkyl ether is obtained, which is free from bromine and dyes in bluish green shades fast to acid and alkali.

The side chain sulfonation of the alkylated products is preferably carried out by treatment of dry pyridine solutions of the color with pyridine-sulfur trioxide, since a direct sulfonation in strong sulfuric acid tends to hydrolyze the alkylol group present in the color molecule, forming hydroxy compounds which have poor fastness properties.

Heating with one to two parts of pyridine-sulfur trioxide per one part of the color in pyridine solution at 60 to 90° C. is generally sufficient to complete the esterification and the reaction product may be isolated by diluting the mass with water, containing an excess of soda ash, removing the pyridine by steam distillation in vacuo and filtering off the precipitated sodium salt, which is practically insoluble in aqueous cold salt solutions, but may be dyed from the usual acid dyeing bath at the usual dyeing temperatures on silk and wool in bluish green shades of excellent fastness properties.

*Example 3*

40 parts of technical Bz-2, Bz-2'-dihydroxydibenzanthrone are suspended in 300 parts of "Solvent Naphtha", containing 60 parts of cyclohexene oxide in solution. The mass is heated under agitation in an autoclave at 150 to 155° C. for 12 hours and then cooled to room temperature.

The reaction product, which is precipitated in the crude reaction mass in the form of large, well defined, blue crystals, is filtered off, the cake is washed free from "Solvent Naphtha" with alcohol and dried at 100° C.

The product may be further purified by dissolving 15 parts of these crystals in 400 parts of boiling o-dichlorobenzene, filtering the solution at 160 to 170° C. and allowing the filtrate to cool to room temperature. The highly crystalline precipitate is filtered off and freed from the solvent by washing the cake with alcohol and drying the product. The pure mono-(beta-hydroxycyclohexyl) ether of Bz-2, Bz-2'-dihydroxydibenzanthrone, thus obtained, of the probable structure:

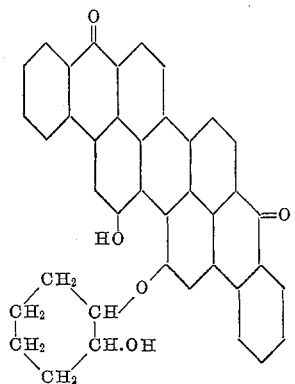

dyes cotton from a blue vat in blue shades, which change to a weak greenish yellow, when treated with diluted alkalies. The product is unstable in concentrated sulfuric acid solution, particularly when heated, and is soluble in all common high boiling solvents at elevated temperatures with a deep blue coloration, exhibiting some reddish brown fluorescence.

The solubility of the product in oils, gasolines, waxes and all kinds of other organic material is very much increased, without, however, changing the coloring shade of the product in these materials to any marked degree, by converting the hydroxy compound into the laurate or other long chain aliphatic ester by methods described in detail in co-pending U. S. application Serial No. 209,994.

*Example 4*

5 parts of the purified mono-(beta-hydroxycyclohexyl) ether of dihydroxydibenzanthrone are heated in 100 parts of nitrobenzene, with 15 parts of potassium carbonate and 10 parts of dimethyl sulfate for 3 hours at 160 to 170° C. The mono-methoxy mono-(beta-hydroxycyclohexyl) ether of Bz-2,Bz-2'-dihydroxydibenzanthrone is obtained, which dyes cotton from a blue vat in alkali and acid-fast bluish green shades.

The methoxy cyclohexylether derivative may be converted into the side chain sulfuric acid ester by treating the product for a short time at low temperatures (0 to 5° C.) with 93% sulfuric acid, or preferably, by heating the compound in pyridine solution with an excess of pyridine-sulfur trioxide at 70 to 80° C. and isolating the ester in the form of the crystalline sodium salt by adding to the diluted pyridine fusion an excess of soda ash, removing the pyridine by steam distillation in vacuo and filtering off the crystalline precipitate, remaining in the still. This water-soluble and stable sulfuric acid ester dyes silk and wool from the usual acid dyeing bath in exceptionally bright green shades of excellent fastness properties. The new dyestuff also possesses the desirable property of having good affinity towards "tin weighted" silk.

By reacting the same mono-cyclohexene oxide ether as obtained in Example 3 with an excess of ethylene dibromide in o-dichlorobenzene solution in the presence of fused sodium acetate and soda ash at reflux temperatures, a product is obtained which dyes in somewhat bluer shades than the methoxy compound above described.

*Example 5*

265 parts of a technical filter press cake, containing about 0.05% free sulfuric acid and the equivalent of 100 parts of dry Bz-2,Bz-2'-dihydroxydibenzanthrone are suspended in 2000 parts of o-dichlorobenzene. The mass is distilled under agitation until the temperature reaches 175 to 178° C. and the remaining suspension is free from water. 200 parts of cyclohexene oxide are then slowly added, over a period of 3 to 5 hours (preferably while continually distilling the mass at a slow rate at 170 to 175° C. and returning the dried distillate to the reaction mass). This heating is continued for a total of 10 hours or until the starting material is completely converted into large, well defined, blue crystals, which are filtered off after cooling the mass to below 100° C. The filter cake is washed with a small amount of fresh o-dichlorobenzene and then with alcohol and dried at 100° C., or the cake may be freed from o-dichlorobenzene by steam distillation and the product isolated by filtration, and drying.

The blue crystals, thus obtained, may be further purified by recrystallization from high boiling solvents, such as o-dichlorobenzene, trichlorobenzene, or nitrobenzene, in which the product is soluble at high temperatures and but slightly soluble at room temperature.

The purified compound is identical with the corresponding purified product of Example 3.

*Example 6*

20 parts of purified, pulverized Bz-2,Bz-2'-dihydroxyisodibenzanthrone are suspended in 360 parts of dry benzene, containing 50 parts of propylene oxide in solution. The suspension is heated in an iron autoclave at 180 to 187° C. for 12 hours at a pressure of from 135 to 180 lbs. per square inch. The charge is then cooled to room temperature and filtered. The cake is washed free from solvent with alcohol and dried at 100° C.

The crude product may be purified by dissolving it in 80 parts of trichlorobenzene per part of dry crude product at 200° C., filtering the solution, at this temperature and allowing the purified product to crystallize out from the filtrate by cooling to room temperature or by steam distilling the filtrate free from solvent. The isolated, dry material, thus obtained, is a crystalline, blue colored solid, which dyes cotton from a blue vat in blue shades, which are fast to alkalies and acids. It is somewhat soluble in solvents, especially at higher temperature, and is more soluble in the vat than the known dialkylation derivatives and may be converted by the usual methods into the alkali metal salts of the leuco-sulfuric acid ester of the dyestuff, which are also more soluble in water and in the usual printing gum preparations than the corresponding leuco-sulfuric acid salts of dimethoxyisodibenzanthrone. The new vat dye is the (beta-hydroxypropyl) ether of dihydroxyisodibenzanthrone.

*Example 7*

20 parts of the Bz-2,Bz-2'-dihydroxyisodibenzanthrone are suspended in 350 parts of o-dichlorobenzene, containing 70 parts of cyclohexene oxide in solution. The suspension is then heated to reflux temperature (170 to 175° C.) for a total of 14 hours and then cooled to 100° C. and filtered. The filter cake is slurried in 1000 parts of trichlorobenzene, the suspension is heated to 200° C. and filtered at this temperature. The filtrate is steam distilled free from solvent and the residual solid is filtered off and dried at 100° C. The (beta-hydroxycyclohexyl) ether of the dihydroxyisodibenzanthrone, thus obtained, is a blue colored product. It dyes cotton from a blue vat in greenish blue shades, which are fast to alkalies and acids. It is similar in properties to the corresponding propylene derivative, described in the previous example.

As illustrated in the above examples, the alkylene oxide is preferably employed in excess of that amount necessary to effect the alkylation. In fact, a sufficient excess of the compound may be employed to serve as the reaction medium itself. While the alkali metal salts of the dihydroxydibenzanthrone compounds may be employed, the free OH compounds are preferred since with the free OH compounds much higher yields and purer products are obtained. The reaction is preferably carried out under neutral or slightly acid conditions. When working with the ordinary plant filter press cakes of the starting materials, which are purified or isolated from acid solution, sufficient acid remains in the cake to give the desirable acidity.

The further alkylation of the mono-alkylol ether of Bz-2,Bz-2'-dihydroxydibenzanthrone may be effected by any of the processes disclosed in the prior art, for the alkylation of the parent dihydroxy compounds.

The side chain hydroxyl radical in these new alkylol ethers may be esterified with sulfating agents, either by reacting them with cold (below 20° C.) sulfuric acid of approximately 93%, or by treatment with the pyridine sulfur trioxide compound in pyridine as illustrated by the above example at temperatures of from room temperature to about 115° C. These new sulfonic acids, or more accurately speaking, sulfates, are water soluble compounds and may be employed for the dyeing of wool and silk by the usual methods.

The non-sulfonated ethers may also be further esterified with organic acid chlorides or anhydrides to give oil soluble fluorescent colors, as more particularly described in co-pending U. S. application Serial No. 209,994.

The expressions "hydroxydibenzanthrones", "a hydroxydibenzanthrone", "dihydroxydibenzanthrones", etc., are used in the broad sense in the specification and claims to designate the hydroxy derivatives of both dibenzanthrone and isodibenzanthrone. Where the indefinite article is not used in the expression or the expression otherwise designates a single compound, only the dibenzanthrone derivative is intended.

I claim:

1. The compounds of the class consisting of the alkylol and cyclo-alkylol ethers of Bz-2,Bz-2'-dihydroxydibenzanthrone and Bz-2,Bz-2'-dihydroxyisodibenzanthrone which carry at least one group of the class consisting of beta-hydroxyalkyl ether and beta-hydroxycycloalkyl ether groups in one of the Bz-2 positions, and their sulfonation products.

2. A compound of the class consisting of monoalkylol and monocyclo-alkylol ethers of a Bz-2-hydroxydibenzanthrone.

3. Compounds of the class consisting of the monoalkylol and monocyclo-alkylol diethers of Bz-2,Bz-2'-dihydroxydibenzanthrone, and their sulfonation products.

4. The mono-(beta-hydroxypropyl) ether of a Bz-2-hydroxydibenzanthrone.

5. The mono-(beta-hydroxycyclohexyl) ether of Bz-2,Bz-2'-dihydroxydibenzanthrone.

6. The sulfonation product of the mono-(beta-hydroxycyclohexyl) ether of Bz-2-hydroxy-Bz-2'-methoxydibenzanthrone.

7. The process for preparing alkylol and cycloalkylol ethers of hydroxydibenzanthrone which comprises heating a Bz-2,Bz-2'-dihydroxydibenzanthrone with an alpha-beta-alkylene oxide until reaction is substantially completed.

8. The process for preparing alkylol and cycloalkylol ethers of Bz-2,Bz-2'-dihydroxydibenzanthrone which comprises heating Bz-2,Bz-2'-dihydroxydibenzanthrone with an alpha-beta-alkylene oxide until one alkylol group has been introduced into the molecule.

9. The process for preparing alkylol and cycloalkylol ethers of Bz-2,Bz-2'-dihydroxydibenzanthrone which comprises heating Bz-2,Bz-2'-dihydroxydibenzanthrone with an alpha-beta-alkylene oxide until one alkylol group has been introduced into the molecule, and further reacting the monoalkylol ether of the Bz-2,Bz-2'-dihydroxydibenzanthrone with an alkylating agent to substantially completely etherify the remaining Bz-2'-hydroxy group.

10. The process for preparing alkylol and cycloalkylol ethers of Bz-2,Bz-2'-dihydroxydibenzanthrone which comprises heating Bz-2,Bz-2'-dihydroxydibenzanthrone with an alpha-beta-alkylene oxide until one alkylol group has been introduced into the molecule, further reacting the monoalkylol ether of the Bz-2,Bz-2'-dihydroxydibenzanthrone with an alkylating agent to substantially completely etherify the remaining Bz-2' hydroxy group and sulfonating the free OH group of the alkylol ether radical by subjecting the resulting compound to the action of a sulfonating agent of the class consisting of concentrated sulfuric acid, sulfur trioxide, and sulfur trioxide liberating agents, at temperatures below 100° C.

OTTO STALLMANN.